(12) United States Patent
Carson

(10) Patent No.: US 9,194,411 B2
(45) Date of Patent: Nov. 24, 2015

(54) METHOD AND APPARATUS FOR SUSPENDING DUCT BY INSERTED CORNER MEMBERS

(71) Applicant: Jeffrey Kenneth Carson, Whitby (CA)

(72) Inventor: Jeffrey Kenneth Carson, Whitby (CA)

(73) Assignee: JBT STEEL INDUSTRIES, INC, Whitby (CA)

( * ) Notice: Subject to any disclaimer, the term of this patent is extended or adjusted under 35 U.S.C. 154(b) by 0 days.

(21) Appl. No.: 14/259,298

(22) Filed: Apr. 23, 2014

(65) Prior Publication Data

US 2014/0234022 A1    Aug. 21, 2014

Related U.S. Application Data

(62) Division of application No. 13/168,637, filed on Jun. 24, 2011.

(51) Int. Cl.

| F16L 3/14 | (2006.01) |
|---|---|
| F16B 17/00 | (2006.01) |
| F16L 23/14 | (2006.01) |
| F16L 3/00 | (2006.01) |
| F24F 13/02 | (2006.01) |

(52) U.S. Cl.
CPC . *F16B 17/00* (2013.01); *F16L 3/00* (2013.01); *F16L 3/14* (2013.01); *F16L 23/14* (2013.01); *F24F 13/0209* (2013.01); *F24F 13/0254* (2013.01); *F16B 17/008* (2013.01); *Y10T 29/49826* (2015.01); *Y10T 403/70* (2015.01)

(58) Field of Classification Search
CPC .............. F16L 3/00; F16L 3/14; F16L 23/14; F16B 17/00; F24F 13/0209; F24F 13/0254
USPC ........ 138/107, 109; 248/58, 59, 61, 317, 320, 248/322, 323, 327, 328
See application file for complete search history.

(56) References Cited

U.S. PATENT DOCUMENTS

| 1,132,999 | A | * | 3/1915 | Beers .............................. 248/62 |
|---|---|---|---|---|
| 3,136,841 | A | * | 6/1964 | Stiner ......................... 174/40 R |
| 3,387,809 | A | * | 6/1968 | Zwerling ........................ 248/58 |
| 5,137,057 | A | * | 8/1992 | Hummert, III ............... 138/107 |
| 5,845,037 | A | * | 12/1998 | Miekis .......................... 385/136 |
| 7,320,453 | B2 | * | 1/2008 | Berlyn et al. ................. 248/328 |
| 2010/0314502 | A1 | * | 12/2010 | Miles et al. .................... 248/59 |

* cited by examiner

*Primary Examiner* — J. Casimer Jacyna
(74) *Attorney, Agent, or Firm* — Grogan, Tuccillo & Vanderleeden, LLP

(57) ABSTRACT

An air transport duct, and sections of such duct, capable of connection to a support by support members and attachment members formed from two mating members. Each section has two terminal open ends and a flange disposed around each open end for connection to a flange of an adjacent section. Each flange includes two relatively transverse receiving channels adjacent to a corner of the flange, and an insertable corner member positioned into the channels. The corner member is attached to the flange by a load-bearing connection, and can support a predetermined portion of a weight of the duct by connection of the corner member to a first mating member connectable to a second mating member secured to a corresponding support member. A method of connecting a duct to a support by forming a load-bearing connection between a corner member and a flange.

15 Claims, 12 Drawing Sheets

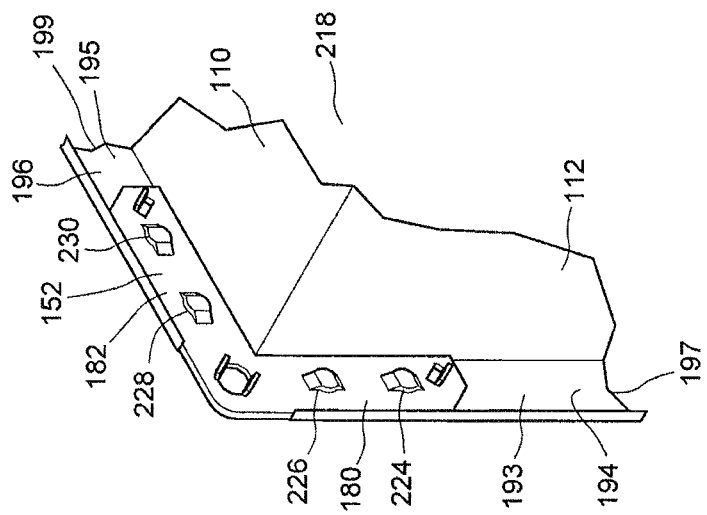
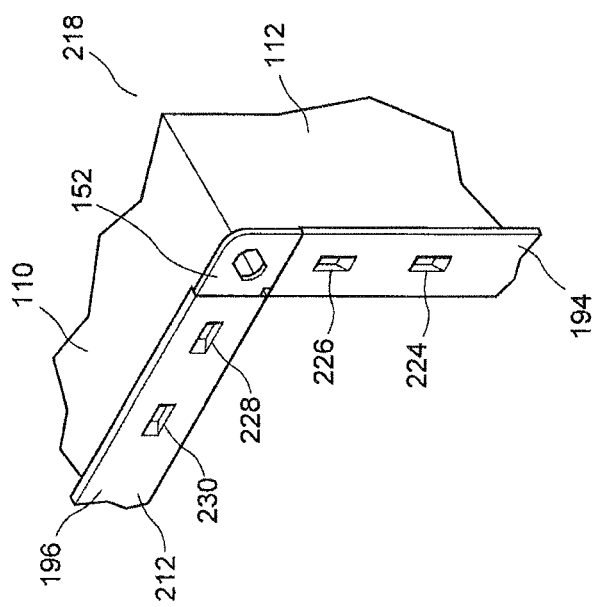
Figure 5A
Figure 5B

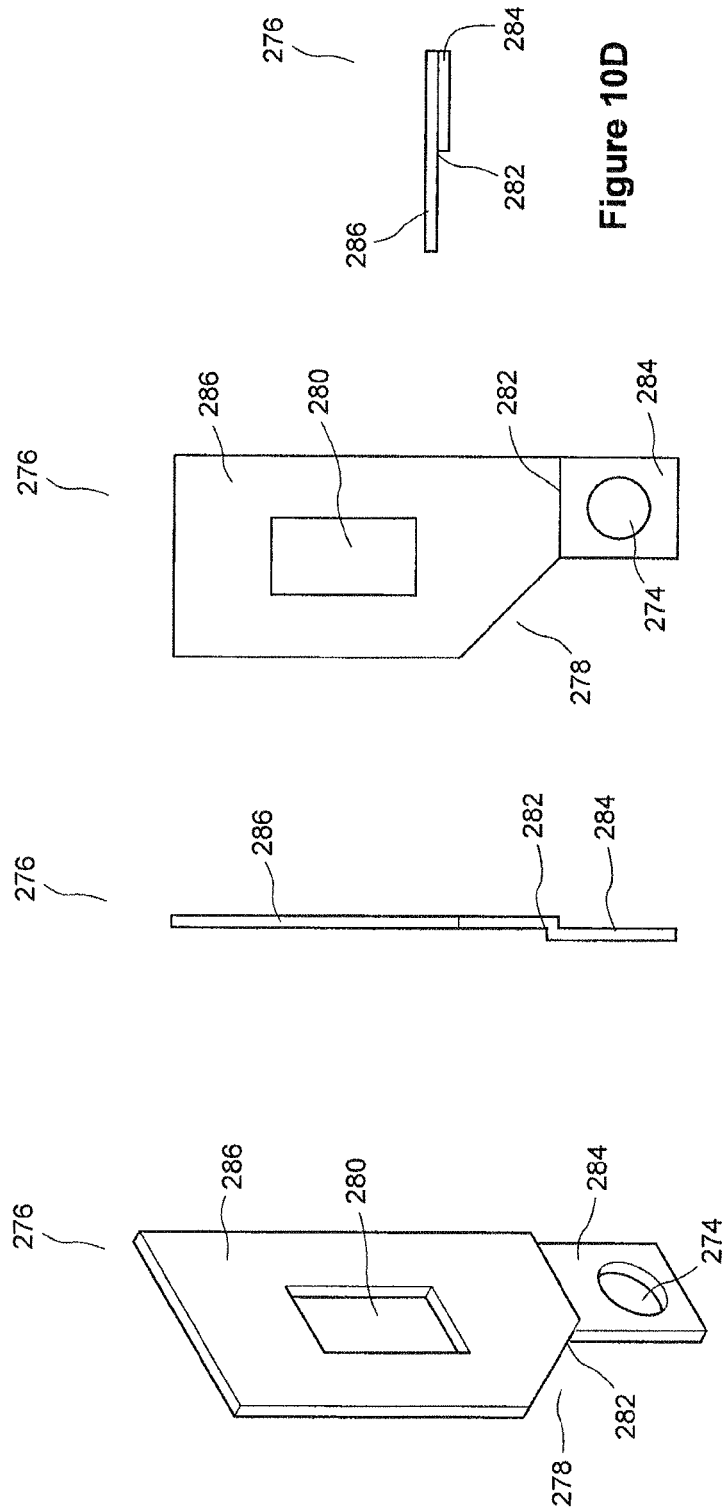

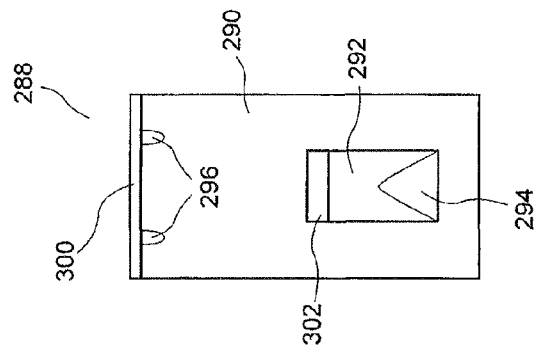
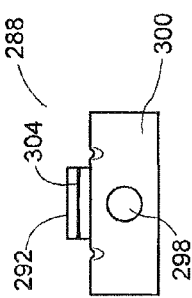
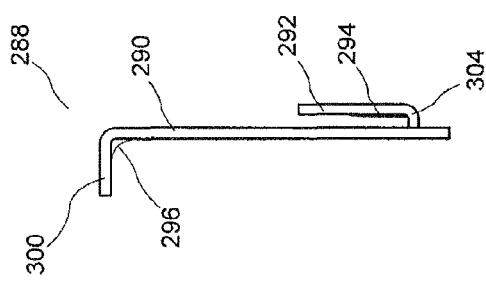
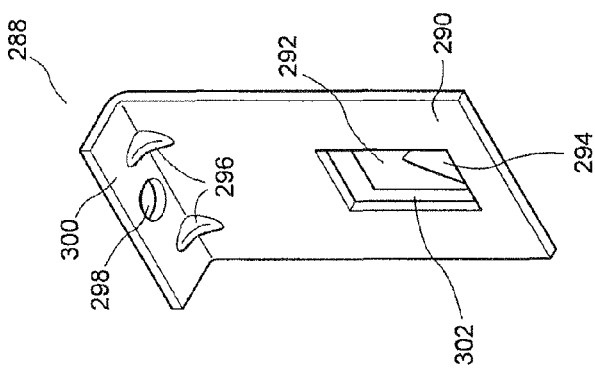

METHOD AND APPARATUS FOR SUSPENDING DUCT BY INSERTED CORNER MEMBERS

CROSS REFERENCE TO RELATED APPLICATIONS

This application is a divisional application of U.S. Utility application Ser. No. 13/168,637, filed on Jun. 24, 2011, which claims the benefit of U.S. Provisional Application Ser. No. 61/478,300, filed on Apr. 22, 2011, both of which are herein incorporated by reference in their entireties.

FIELD OF THE INVENTION

The present invention relates to the field of heating, ventilating, and air conditioning ductwork and more particularly to a method and apparatus for connecting ductwork to a support.

BACKGROUND OF THE INVENTION

Buildings such as factories, office buildings, and homes typically require the transport of air to, within and from such buildings. This may involve the removal of stale air, as well as the distribution of air conditioned in a variety of ways, including heating, cooling, adding or removing moisture and filtration, to name some examples. The technology and systems related to the conditioning and distribution of air in buildings are generally referred to by the acronym HVAC (Heating, Ventilating, and Air Conditioning).

In some HVAC systems, ducts may be used to remove air or distribute conditioned air throughout a building. The ducts used in a HVAC system are often collectively referred to in the art as "ductwork", and individually as "ducting". Some HVAC systems may also incorporate the use of fans or other mechanisms to force the air through the ductwork, as well as components to condition the air, such as furnaces or humidifiers.

One common type of ducting is a rectangular duct formed from sheet metal, commonly referred to in the art as "rectangular metal duct". This type of duct is formed by constructing separate, hollow, and elongated sections of duct, and connecting same together so as to form ductwork through which air may be transported.

As air must typically be transported throughout a building, ductwork is also typically installed throughout a building, preferably in unobtrusive locations. Therefore, one common installation procedure is to suspend ducting from elevated supports, such as overhead pipes or the surfaces of ceilings.

There are a number of ways known in the art to suspend rectangular metal ducts from a support. Most commonly, one end of a length of steel wire, steel strap or threaded rod may be anchored to a support using any of a variety of mechanisms well known in the art. The other end of the length of steel wire, steel strap or threaded rod may then be connected to the duct to provide support for the duct. Steel wire and steel straps may directly support the duct by encircling the duct, whereas threaded rods are generally used in conjunction with a cradle bar, also known in some circumstances as a support channel, that supports the duct from below. Cradle bars are widely used to suspend rectangular metal ducts, and generally involve supporting a duct from below at regular intervals with a cradle bar, with each terminal end of each cradle bar being connected to one end of a threaded rod, with the other end of the threaded rod being anchored to supports such as an overhead pipe or ceiling surface. Although steel wire may be employed to directly support a duct as aforesaid, steel wire may also be used in conjunction with cradle bars if so desired.

Unfortunately, there are problems associated with prior art methods of supporting rectangular metal duct. These include high labour and material costs and the structural integrity of the support methods. For instance, it has been known with steel wire that the latter can at times cut into the sheet metal wall of a duct which it directly supports, depending on weight considerations. With regard to cradle bars, lengths of cradle bars must typically be cut to size to correspond to the width of the particular ductwork being supported, thereby increasing the labour costs of their manufacture or installation. Also with regard to cradle bars, the lengths of supporting steel wire or rod which must be deployed in installation must be long enough to reach the bottom supported surface of the affected ductwork, given that the cradle bars are typically located and support the ductwork from underneath same. Accordingly, there is a need for a method, and apparatus, for connecting a duct to a support, which is intended to assist with eliminating or alleviating some or all of the aforementioned problems associated with the prior art approaches.

SUMMARY OF THE INVENTION

In one aspect of the present invention there is provided a method of connecting an elongate air transport duct to a support by means of a plurality of support members located between the duct and the support, the duct having a generally rectangular cross-section and comprising a plurality of interconnected duct sections, each of the duct sections comprising two terminal open ends and a flange disposed around each of the open ends for abutting connection to the flange of an adjacent duct section of the duct, each the flange comprising a first receiving channel adjacent to a first corner thereof, a second receiving channel that is generally transverse to the first receiving channel and adjacent the first corner, and a first insertable corner member positioned into the first receiving channel and into the second receiving channel, the method comprising the step of: forming a load-bearing connection between each the first insertable corner member and at least one of the first receiving channel and the second receiving channel into which each the first inserted corner member is positioned, such that each the first insertable corner member is thereafter capable of supporting a predetermined portion of a weight of the duct by connection of each the first insertable corner member to one of the plurality of support members.

In another aspect of the present invention there is provided a duct section of an air transport duct that is capable of connection to a support by means of a plurality of support members located between the duct and the support, the duct section having a generally rectangular cross-section and comprising two terminal open ends and a flange disposed around each of the open ends for abutting connection to the flange of an adjacent duct section of the duct, each the flange comprising a first receiving channel adjacent to a first corner thereof, a second receiving channel that is generally transverse to the first receiving channel and adjacent the first corner, and a first insertable corner member positioned into the first receiving channel and into the second receiving channel, wherein the first insertable corner member is attached to at least one of the first receiving channel and the second receiving channel by means of a load-bearing connection therebetween, such that the first insertable corner member is thereafter capable of supporting a predetermined portion of a weight of the duct by connection of the first insertable corner member to one of the plurality of support members.

In another aspect of the present invention there is provided an elongate air transport duct for connecting to a support by means of a plurality of support members located between the duct and the support, the duct having a generally rectangular cross-section and comprising a plurality of interconnected duct sections, each of the duct sections comprising two terminal open ends and a flange positioned around each of the open ends for abutting connection to the flange of an adjacent duct section of the duct, each the flange comprising a first receiving channel adjacent to a first corner thereof, a second receiving channel that is generally transverse to the first receiving channel and adjacent the first corner, and a first insertable corner member positioned into the first receiving channel and into the second receiving channel, wherein each the first insertable corner member is attached to at least one of the first receiving channel and the second receiving channel into which each the first inserted corner member is positioned by means of a load-bearing connection therebetween, such that each the first insertable corner member is capable of supporting a predetermined portion of a weight of the duct by connection of each the first insertable corner member to one of the plurality of support members.

In another aspect of the present invention there is provided an attachment member for connecting an air transport duct to a support by means of a support member located between the duct and the support, the attachment member having first and second mating members that are connectable to one another, the first mating member providing a first connector for securing the attachment member to a duct section of the duct, the second mating member providing a second connector for securing the attachment member to the support member.

In another aspect of the present invention there is provided a method of connecting an elongate air transport duct to a support by means of a plurality of support members located between the duct and the support, the duct having a generally rectangular cross-section and comprising a plurality of interconnected duct sections, each of the duct sections comprising two terminal open ends and a flange disposed around each of the open ends for abutting connection to a flange of an adjacent duct section of the duct, each the flange comprising a first flange wall adjacent to a first corner thereof, a second flange wall that is generally transverse to the first flange wall and adjacent the first corner, and a first corner member positioned adjacent to the first flange wall and to the second flange wall, the method comprising the steps of: forming a load-bearing connection between each the first corner member and at least one of the adjacently positioned first flange wall and the second flange wall, such that each the first corner member is thereafter capable of supporting a predetermined portion of a weight of the duct by connection of each the first corner member to one of the plurality of support members; and forming a connection between at least one of the first insertable corner members to one of the plurality of support members.

In another aspect of the present invention there is provided an air transport duct for connecting to a support by means of at least one support member located between the duct and the support, the duct comprising at least one duct section, each of the at least one duct section comprising two terminal open ends and a flange positioned around each of the open ends for abutting connection to the flange of a corresponding duct section, each the flange comprising a first receiving channel adjacent to a first corner thereof, a second receiving channel that is generally transverse to the first receiving channel and adjacent the first corner, and a first insertable corner member positioned into the first receiving channel and into the second receiving channel, wherein each the first insertable corner member is attached to at least one of the first receiving channel and the second receiving channel into which each the first inserted corner member is positioned by means of a load-bearing connection therebetween, such that each the first insertable corner member is capable of supporting a predetermined portion of a weight of the duct by connection of each the first insertable corner member to one of the at least one support member.

Additional aspects and advantages of the present invention will be apparent in view of the description which follows. It should be understood, however, that the detailed description, while indicating embodiments of the invention, are given by way of illustration only, since various changes and modifications within the spirit and scope of the invention will become apparent to those skilled in the art from this detailed description.

BRIEF DESCRIPTION OF THE DRAWINGS

With reference to embodiments thereof, the invention will next be described in relation to the drawings, which are intended to be non-limiting examples of various embodiments of the present invention, in which:

FIG. 5A is a partial perspective view of the corner and corner member of FIG. 4B, showing metal formed load-bearing connections for attaching the corner member to its two corresponding adjacent channels of the duct section;

FIG. 5B is another partial perspective view of the corner and corner member of FIG. 5A, viewed in a direction opposite to that of FIG. 5A;

FIGS. 10A, 10B, 10C, and 10D are multiple views of a female mating member for connection to a corner member that has been inserted into its corresponding adjacent channels of a duct section and connected to the channels according to FIGS. 5A and 5B;

FIGS. 11A, 11B, 11C, and 11D are multiple views of a male mating member for connection to the female mating member of FIGS. 10A, 10B, 10C, and 10D;

DETAILED DESCRIPTION OF THE INVENTION

According to embodiments of the present invention, various apparatus and methods for connecting ducting at mating corners of its constituent duct sections to existing means of support such as wires, rods or straps will next be described in detail, including processes for metal formed load-bearing attachment of inserted corner members to corresponding adjacent channels of the duct section with which the inserted corner members are held in contact, and a two-piece attachment member comprising a male mating member and a female mating member for connecting the inserted and attached corner members to existing means of support.

Figure 1:
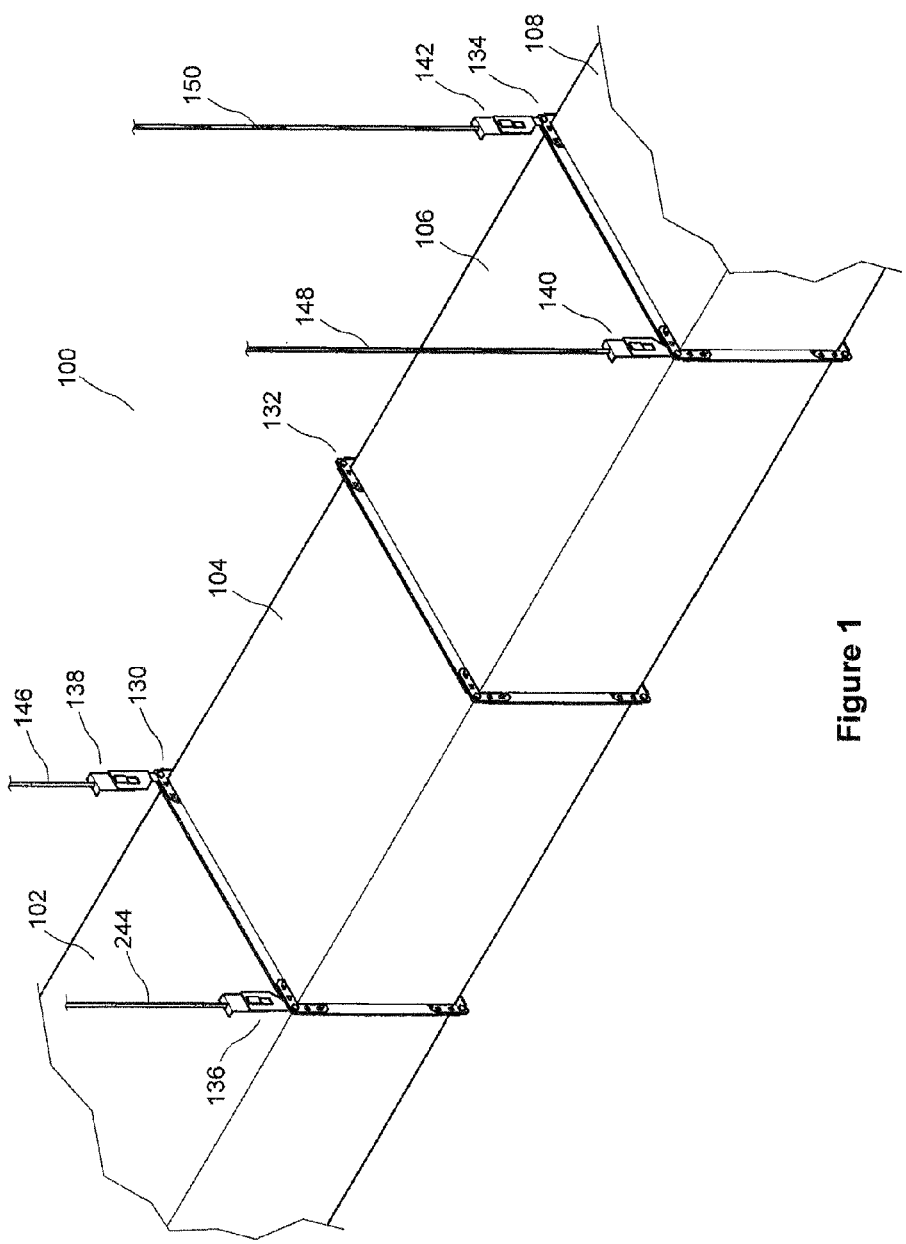
FIG. 1 is a perspective view of interconnected and suspended duct sections forming a portion of a duct, according to an illustrative embodiment of the present invention.

With reference to FIG. 1, there is illustrated a plurality of interconnected and suspended duct sections 102, 104, 106, 108 that form a portion of a duct 100, with each duct section constituting a separate, hollow and elongated rectangular metal section of duct through which air may be transported.

Figure 2:
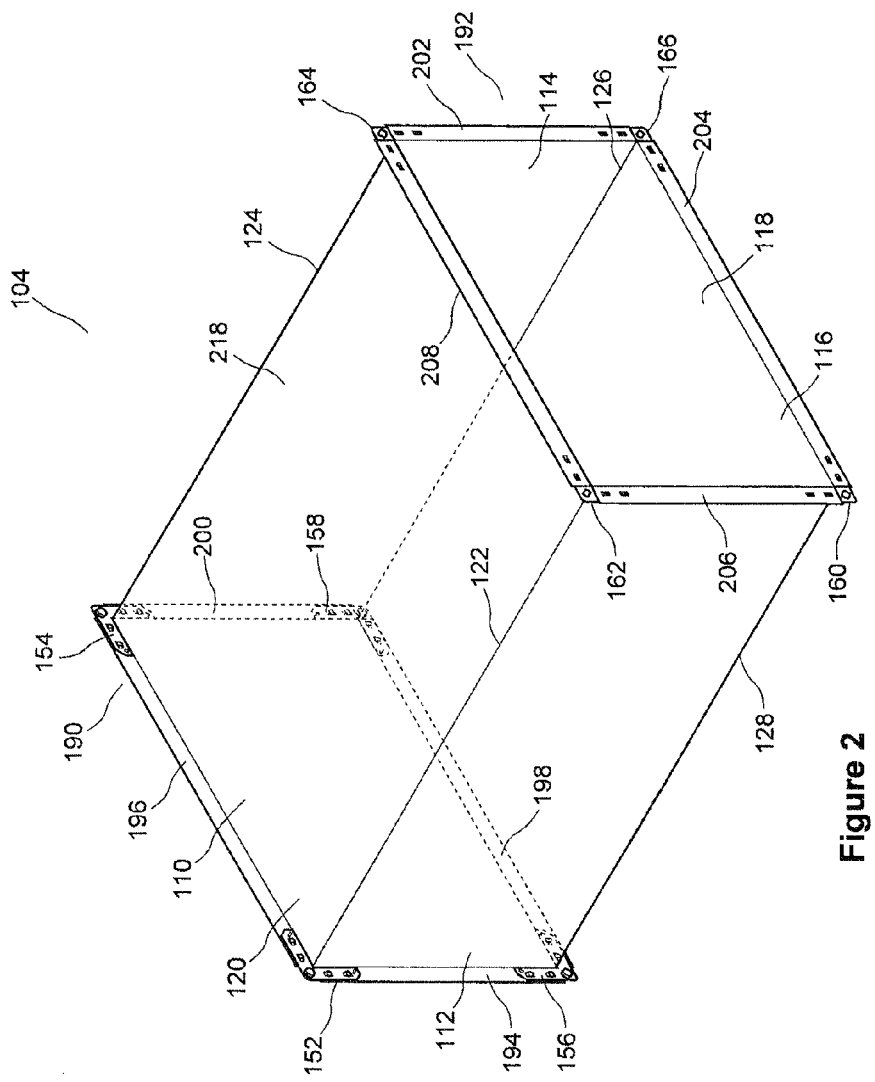
FIG. 2 is a perspective view of a duct section from the duct of FIG. 1, showing a flange formed along the periphery of each terminal end thereof.

FIG. 2 depicts duct section 104 in isolation, this duct section is generally representative of duct sections such as duct sections 102, 106, 108. Duct section 104 comprises a body 218 and flanges 190, 192, each described in more detail below. In this embodiment of the present invention, duct section 104 is formed sheet metal, but in other embodiments of the present invention, other materials well known in the art such as plastic, wood, and fibreglass may be used in whole or in part. Also, in this embodiment of the present invention, each duct section is elongated and rectangular, but in other embodiments of the present invention, other shapes of duct sections may be used, such as duct sections with a circular cross-section.

Body 218 of duct section 104 may be formed from sheet metal by any number of methods and apparatus well known in the art, such as the methods and apparatus readily available from Iowa Precision Industries of Cedar Rapids, Iowa, and including the Pro-Fabriduct® automated rectangular duct forming and fabricating lines. Body 218 has four panels 110, 112, 114, 116 arranged to form a rectangular prism with two opposing and open sides 118, 120. For ease of reference and without limiting the generality of any description, panel 110 and its outwardly facing direction will respectively be referred to as the "top" panel and the "up" direction and panel 116 and its outwardly facing direction will respectively be referred to as the "bottom" panel and the "down" direction.

Panels 110, 112 meet at a bend 122 that extends between sides 118, 120. Additional bends 124, 126, 128 extend between sides 118, 120 and are respectively located where panels 110, 114, panels 114, 116, and panels 112, 116 meet. As body 218 is typically formed from a single sheet of sheet metal, an arbitrary three of bends 122, 124, 126, 128 are right angle bends in the sheet metal, whereas the remaining fourth bend is formed by joining at a right angle the edges of the corresponding panels. Methods to join at a right angle two edges of sheet metal are well known in the art, such as by means of a Pittsburgh lock (not shown).

Flange 190 is a rectangular frame that surrounds side 120. Flange 190 has four elongated channels 194, 196, 198, 200 that each extend the length of one edge of side 120 to jointly form a rectangular frame without corners, and four L-shaped corner members 152, 154, 156, 158 that each respectively engage with two of the channels at the above-noted missing corners so that a complete rectangular frame is formed. Specifically, corner member 152 engages with channels 194, 196, corner member 154 engages with channels 196, 200, corner member 156 engages with channels 194, 198, and corner member 158 engages with channels 198, 200. Flange 192 similarly comprises four elongated channels 202, 204, 206, 208 and four L-shaped corner members 160, 162, 164, 166.

Figure 3:
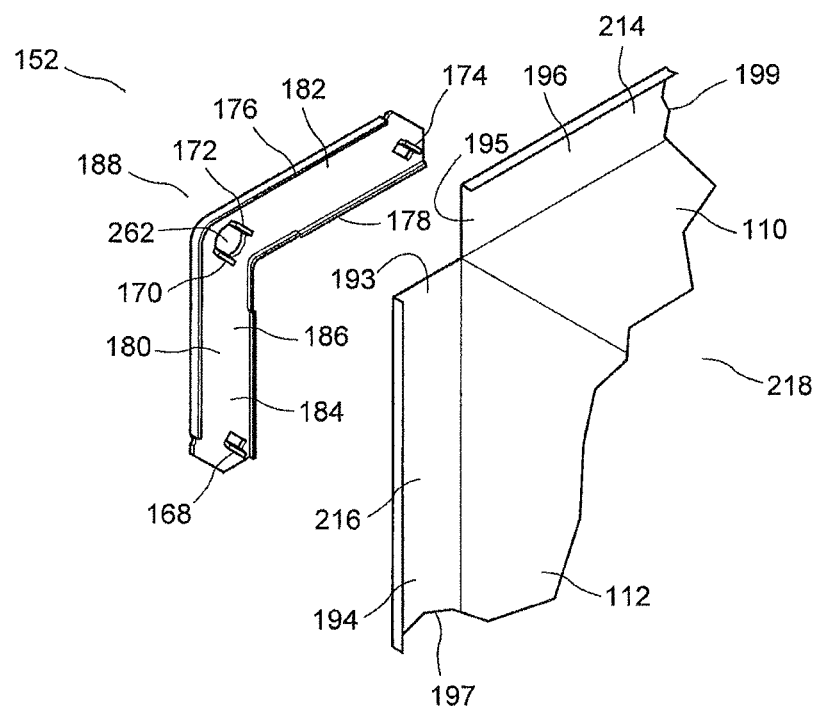
FIG. 3 is an exploded partial view of a corner of the duct section of FIG. 2 with a corner member intended for engagement with two adjacent channels of the duct section.

The aforesaid channels, corner members and their manner of engagement are described in more detail with reference to FIG. 3. FIG. 3 depicts a single corner of duct section 104 before corner member 152 engages with channels 194, 196 and is generally representative of the other channels and corner members of duct section 104, and their manner of engagement.

Corner member 152 may be formed from sheet metal by any number of methods well known in the art such as stamping. Corner member 152 comprises legs 182, 180 that are disposed at a right angle about corner 188 to form an L-shape. An opening 262 is positioned in corner 188. When corner member 152 is respectively received by and engaged with a corresponding channel, such as channels 194, 196, the channel surface 184 of corner member 152 abuts with the flange wall of its corresponding channel, in that channel surface 184 is a flat side of corner member 152 that contacts the corresponding opposed surface, such as inside surfaces 193, 195 of flange walls 197, 199 of channels 194, 196. As will be described in more detail below, channels 194, 196 also each have a flat flange surface on the side of flange walls 197, 199 opposite inside surfaces 193, 195 configured to mate with another flange surface of another channel of another duct section. An exterior surface 186 is located on the opposite side of corner member 152 relative to channel surface 184 and faces away from the channel when corner member 152 is engaged therewith. Corner member 152 may additionally have upstanding flanges 176, 178 or other suitable reinforcement well known in the art.

Corner member 152 may be formed to be stackable with another corner member. In this embodiment of the present invention, corner member 152 has upstanding projections 168, 170, 172, 174 that project away from exterior surface 186 and may be individually formed by stamping a tab out of the sheet metal used to form corner member 152 and bending the tab so that it is configured to project away from exterior surface 186. When multiple corner members are stacked, the upstanding projections of a stacked corner member engages the channel surface of an adjacent stacked corner member, and operate to support and space apart the stacked corner members.

In this embodiment of the present invention, corner member 152 may be a corner member available from a variety of suppliers further to a license to U.S. Pat. No. 5,342,100 to Goodhue, and compatible with the Cornermatic® automatic corner inserter readily available from Iowa Precision Industries of Cedar Rapids, Iowa. In other embodiments of the present invention, particularly where each duct section is not rectangular, corner member 152 may not be configured to form an L-shape, but rather, may, for example, form a V-shape, or even an arc.

Figure 4C:
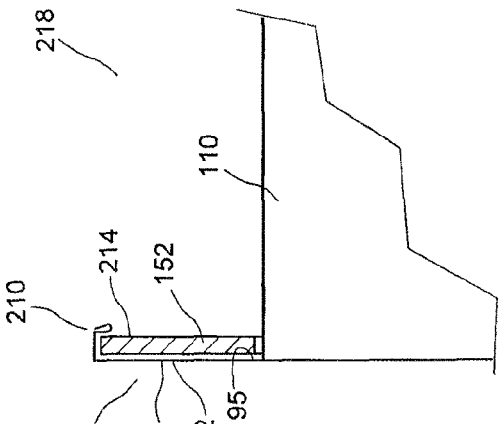
FIG. 4C is a partial cross-sectional view of the corner of FIG. 4B wherein a leading edge of the TDC® style channel is crimped to maintain the corner member in contact with its two corresponding adjacent channels of the duct section.
Figure 4B:
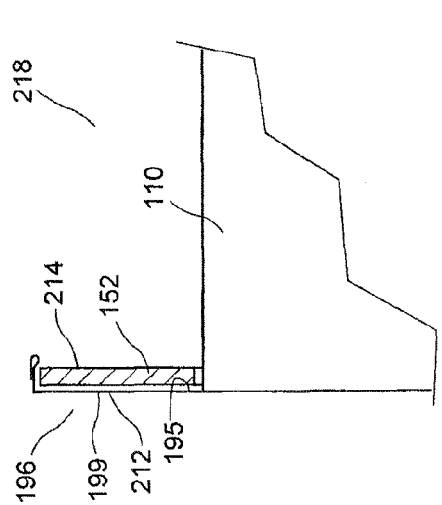
FIG. 4B is a partial cross-sectional view of the corner of the duct section of FIG. 2, wherein the corner member is depicted in its engagement position with a prior art transverse duct connector ("TDC®") style channel formed along the periphery of a terminal end of the duct section.
Figure 4A:
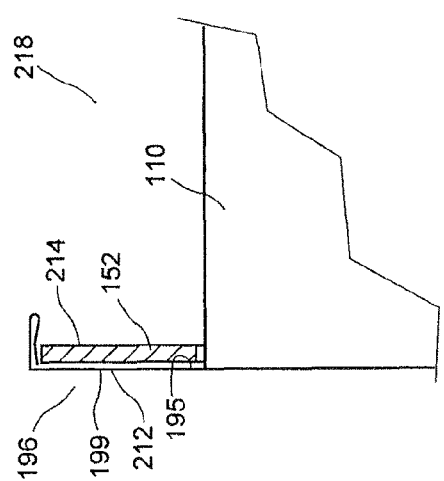
FIG. 4A is a partial cross-sectional view of the corner of the duct section of FIG. 2, wherein the corner member is depicted in its engagement position with a prior art transverse duct flange ("TDF®") style channel formed along the periphery of a terminal end of the duct section.

With reference to FIG. 3, FIG. 4A, and FIG. 4B, in this embodiment of the present invention, channels 194, 196 are integrally formed with body 218. Channels 194, 196 first extend perpendicularly outwardly from, respectively, panels 112, 110 to form flange walls 197, 199, then extend in a direction parallel to and towards the center of, respectively, panels 112, 110, before doubling-back. FIG. 4A depicts channel 196 wherein it has doubled-back by folding upon itself inwardly towards panel 110 and therefore corresponds to prior art TDF® style flanges. FIG. 4B shows channel 196 wherein it has doubled-back by folding upon itself outwardly away from panel 110 and therefore corresponds to prior art TDC® style flanges. Again with reference to FIG. 3, FIG. 4A, and FIG. 4B, channel 196 has a flange surface 212 on one side of flange wall 199 that, as discussed in more detail below, is configured to mate with another flange surface of another channel of another duct section. Channels 194, 196 also have cavities 216, 214 circumscribed and defined by channels 194, 196 and panels 112, 110, respectively.

In this embodiment of the present invention, channels 194, 196 may be integrally formed from the same sheet of sheet metal as body 218. Methods and apparatus for forming duct section 104 with channels 194, 196 are readily available from Iowa Precision Industries of Cedar Rapids, Iowa, and also further described in U.S. Pat. No. 4,466,641 to Heilman et al. and U.S. Pat. No. 4,579,375 to Fischer et al. In other embodiments of the present invention, channels may be separately formed and connected to body 218 by means well known in the art such as welding or riveting. Related methods and apparatus for separately forming channels and connecting such channels to a body of a duct are readily available from Ductmate Industries, Inc. of Charleroi, Pa., and also further described in U.S. Pat. No. 4,218,079 to Arnoldt.

Leg 180 of corner member 152 is configured to be engaged with channel 194 by inserting leg 180 into cavity 216. Leg 182 of corner member 152 is similarly configured to be engaged with channel 196 by inserting leg 182 into cavity 214. Once so inserted, corner member 152 is engaged with channels 194, 196 to form part of flange 190. Notably, the empty corner between channels 194, 196 is filled with corner member 152.

In some embodiments of the present invention, corner member 152 is engaged with channels 194, 196 by means of manual insertion. Other embodiments of the present invention may use well known methods and apparatus disclosed for automatically engaging corner members with channels. This includes the Cornermatic® automatic corner inserter readily available from Iowa Precision Industries of Cedar Rapids, Iowa, and methods and apparatus further disclosed by U.S. Pat. No. 5,321,880 to Goodhue and U.S. Pat. No. 5,283,944 to Goodhue.

While the original form of channels 196, 194 somewhat retain legs 182, 180 in cavities 214, 216, additional retention means are typically employed. In some embodiments of the present invention, portions of channels 196, 194 may be crimped over legs 182, 180 once corner member 152 has been engaged with channels 196, 194. With reference to illustrative FIG. 4C, the leading edge of channel 196 is crimped over leg 182 so as to better retain leg 182 in cavity 214.

Another drawback is that crimping does not always retain legs 182, 180 in cavities 214, 216 during typical use of duct section 104. For example, it is typical for duct sections to be formed at a commercial duct shop, including the formation of completed flanges comprising in part inserted corner members. One or more duct sections may be connected together, and subsequently transported to a construction site for installation. It is common for corner members to become disengaged during transport and to need to be manually re-inserted at the construction site, despite the use of crimping.

With reference to FIG. 5A and FIG. 5B, in this embodiment of the present invention, corner member 152 is attached to its corresponding flange walls 197, 199 while abutting its corresponding inside surfaces 193, 195 within channels 194, 196 by means of one or more connections, for instance four, metal formed load-bearing connections 224, 226, 228, 230, described in greater detail below. Connections 224, 226 attach leg 180 to the corresponding flange wall 197 while abutting corresponding inside surface 193 of channel 194. Connections 228, 230 similarly attach leg 182 to the corresponding flange wall 199 while abutting corresponding inside surface 195 of channel 196. In this embodiment, connections 224, 226, 228, 230 are formed after corner member 152 has been engaged with channels 194, 196 as previously described. As connections 224, 226, 228, 230 are metal formed and load-bearing, the above-described crimping of channels 194, 196 may be rendered redundant as a means to retain corner member 152 in engagement with channels 194, 196 and as such, the person of skill in this art may very well choose not to deploy the crimping technique as foresaid in conjunction with the present invention. Similarly, whereas the above-described channels first extend perpendicularly outwardly from the panels to form flange walls, then extend in a direction parallel to and towards the center of the panels, before doubling-back, in some embodiments of the present invention, the extending in a direction parallel to and towards the center of the panels, before doubling-back, may not be required. In such circumstances, the channels may comprise only a flange wall to which corner members may be attached with the above-described connections, but the channels may not otherwise engage the corner members.

As described in more detail below, in one embodiment of the present invention, a duct 100 may be supported from existing means of support by connecting the existing means of support directly or indirectly to one or more corner members such as corner member 152. These corner members, such as corner member 152, as described above, are engaged with corresponding channels, such as channels 194, 196, of duct sections, such as duct sections 102, 104, 106, 108 by means of load-bearing connections, such as connections 224, 226, 228, 230. In this context, these connections 224, 226, 228, 230 are termed herein as load-bearing since these connections collectively bear the load of supporting the duct.

In this embodiment of the present invention, connections 224, 226, 228, 230 are obtained by cold-forming a press joint in order to clinch together in a metal forming operation the corner members, such as corner member 152, and the flange walls of corresponding channels, such as flange walls 197, 199 of channels 194, 196. Such clinching results in a mechanical interlock between the sheet metal corresponding to the corner members, such as corner member 152, and the sheet metal corresponding to the flange walls of the channels, such as flange walls 197, 199 of channels 194, 196, and may involve the use of drawing, lancing, expanding, and otherwise deforming sheet metal to form said mechanical interlock.

Figure 6A:
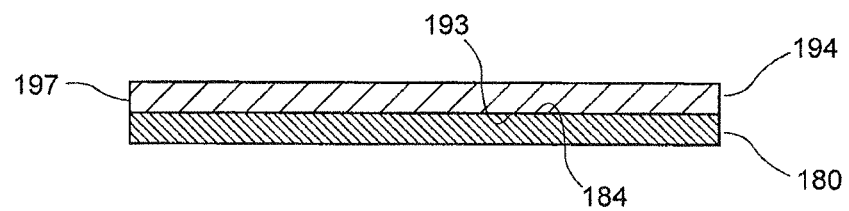
FIGS. 6A, 6B, and 6C are cross-sectional views depicting the steps involved in the creation of a first type of metal formed load-bearing connection of FIG. 5A and FIG. 5B.
Figure 6B:
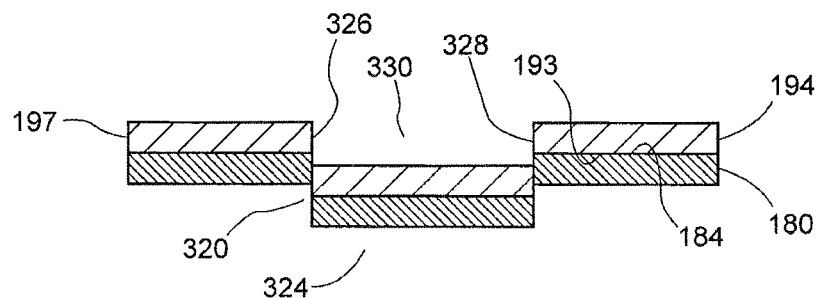
Figure 6C:
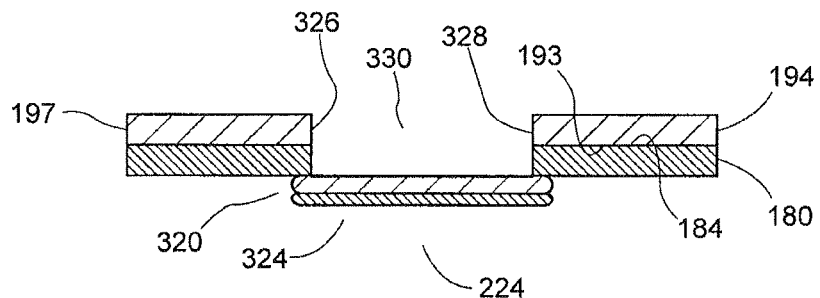

For instance, the connections 224, 226, 228, 230 may be obtained by way of prior-art Lance-N-Loc® joints, namely, a metal forming technology readily available from BTM Corporation of Marysville, Mich., and further described in U.S. Pat. No. 5,150,513 to Sawdon and U.S. Pat. No. 5,177,861 to Sawdon. FIG. 6A, FIG. 6B, and FIG. 6C depict creating representative connection 224 between leg 180 and flange wall 197 of channel 194. In FIG. 6A, and with reference to FIG. 3, FIG. 4A, and FIG. 4B, leg 180 is engaged with channel 194 by having been inserted into cavity 216. Channel surface 184 directly abuts the corresponding inside surface 193 of channel 194. A clamp (not shown) may be used to minimize the gap between leg 180 and inside surface 193 of channel 194, and to temporarily secure together leg 180 to flange wall 197 of channel 194 while forming connection 224.

With reference to FIG. 6B, leg 180 and flange wall 197 of channel 194 are lanced along two parallel planes 326, 328 by a die of rectangular cross-section (not shown), forming a lanced portion 324 disposed between parallel planes 326, 328 and wherein each lance corresponds to the length of the rectangular cross-section of the die (not shown). After lancing, lanced portion 324 is drawn through the thickness of leg 180 and flange wall 197 of channel 194 in the direction from flange wall 197 of channel 194 to leg 180 by the die (not shown), thereby forming the beginnings of a protrusion 320. Lanced portion 324 remains integrally connected to leg 180 and flange wall 197 of channel 194 along the width of the rectangular cross-section of the die (not shown). A cavity 330 in leg 180 and flange wall 197 of channel 194 is formed, when viewed from the side of flange wall 197 of channel 194.

With reference to FIG. 6C, lanced portion 324 is expanded beyond the width of parallel planes 326, 328 by compressing lanced portion 324 with a die (not shown) against an anvil (not shown), thus completing the formation of protrusion 320. As protrusion 320 extends beyond the width of parallel planes 326, 328, protrusion 320 is restricted from being retracted back through the thickness of leg 180 and flange wall 197 of channel 194. As leg 180 and flange wall 197 of channel 194 both remain integrally connected to lanced portion 324, leg 180 and flange wall 197 of channel 194 are restricted from being separated, and connection 224 has interconnected leg 180 and channel 194.

Figure 7A:
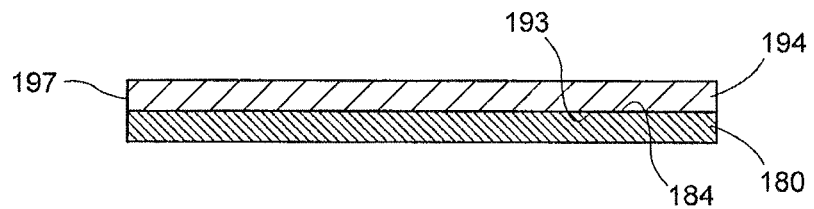
FIGS. 7A, 7B, and 7C are cross-sectional views depicting the steps involved in the creation of a second type of metal formed load-bearing connection of FIG. 5A and FIG. 5B.
Figure 7B:
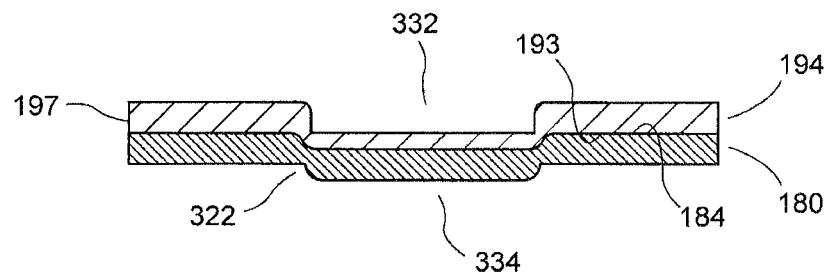
Figure 7C:
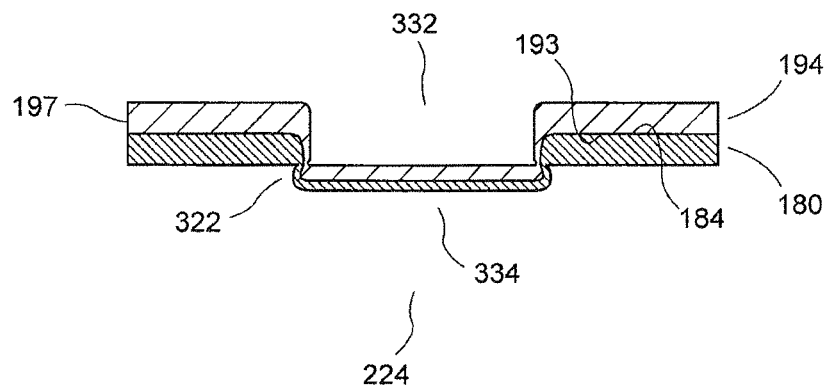

In another embodiment of the present invention, connections 224, 226, 228, 230 are prior-art Tog-L-Loc® joints, namely, a metal forming technology readily available from BTM Corporation of Marysville, Mich., and further described in U.S. Pat. No. 5,150,513 to Sawdon and U.S. Pat. No. 5,177,861 to Sawdon. FIG. 7A, FIG. 7B, and FIG. 7C depict creating representative connection 224 between leg 180 and flange wall 197 of channel 194. In FIG. 7A, and with reference to FIG. 3, FIG. 4A, and FIG. 4B, leg 180 is engaged with channel 194 by having been inserted into cavity 216. Channel surface 184 directly abuts the corresponding inside surface 193 of channel 194. A clamp (not shown) may be used to minimize the gap between leg 180 and inside surface 193 of channel 194, and to temporarily secure together leg 180 to flange wall 197 of channel 194 while forming connection 224.

With reference to FIG. 7B, leg 180 and flange wall 197 of channel 194 are drawn through the thickness of leg 180 and flange wall 197 of channel 194 in the direction from flange wall 197 of channel 194 to leg 180 by a die (not shown) to form drawn portion 334. Drawn portion 334 remains integrally connected to leg 180 and flange wall 197 of channel 194 as neither leg 180 nor flange wall 197 of channel 194 is pierced. The die is circular in cross-section, and so drawn portion 334 is similarly circular from a top view (not shown). A cavity 332 in leg 180 and flange wall 197 of channel 194 is formed, when viewed from the side of flange wall 197 of channel 194, and the beginnings of a protrusion 322 extends from leg 180 corresponding to drawn portion 334.

With reference to FIG. 7C, drawn portion 334 is expanded beyond the original diameter of drawn portion 334 by compressing drawn portion 334 with a die (not shown) against an anvil (not shown), thus completing the formation of protrusion 334. Leg 180, flange wall 197 of channel 194, and drawn portion 334 are therefore in an interlocking configuration wherein leg 180 and flange wall 197 of channel 194 are restricted from being separated, and connection 224 has interconnected leg 180 and channel 194.

In some embodiments of the present invention, it may be advantageous for connections 224, 226, 228, 230 to be Lance-N-Loc®) joints as opposed to Tog-L-Loc® joints. In particular, it has been found that tooling for creating Lance-N-Loc® joints is typically compatible with a wider range of sheet metal thicknesses, an advantage as ducting may be formed from sheet metal of a variety of thicknesses.

Further, duct sections are generally interconnected by mating flange surfaces of a first duct section with flange surfaces of a second duct section, as described in more detail below. Accordingly, it is typically considered to be advantageous for flange surfaces, such as flange surface 212, to be flush so as to improve the seal and fit between two flange surfaces. As described above, both Tog-L-Loc® and Lance-N-Loc® joints result in protrusions, such as protrusions 320, 322. An advantage of a metal formed load-bearing joint of the type described herein is that the mating surfaces of flanges, such as flanges 190, 192, can be rendered free of protrusions so that a flush connection of the opposed flanges of adjacent duct sections may be obtained by causing the protrusions to emanate from the corner member side, namely, the exterior surface of a corner member, such as exterior surface 186 of corner member 152. A further characteristic of Tog-L-Loc® joints is that the thickness of the metal on the side from which the protrusion, such as protrusion 322, emanates must be less than or equal to the thickness of the metal on the opposite side thereof, which is not a characteristic of Lance-N-Loc® joints. Accordingly, as corner members are typically produced in a single thickness, use of Tog-L-Loc® joints with ducting formed from sheet metal thinner than standard corner members would require forming connections in the opposite direction than that described above. This may disadvantageously result in a protrusion extending out from a flange surface and potentially diminishing the efficacy of the seals between two flange surfaces. Those of skill in this art will understand that the particular metal formed load-bearing connection will be selected based on the thickness of the corner members, such as corner member 152, and the thickness of the flange walls of channels, such as flange walls 197, 199 of channels 194, 196, so that the protrusions obtained therefrom, such as protrusions 320, 322, emanate from a surface other than that of the mating flange surface, such as flange surface 212.

With reference to FIG. 5A and FIG. 5B, in this embodiment of the present invention, corner member 152 is interconnected to channels 194, 196 by four Lance-N-Loc® joints constituting connections 224, 226, 228, 230. In other embodiments of the present invention, corner members may be interconnected to channels by a different number of connections. Similarly, in other embodiments of the present invention, other types of connections may be used to interconnect corner members and channels. Alternatives are well-known to those skilled in the art, and may include the use of rivets, bolts, welding, adhesives, and load-bearing crimping. Different types of connections may also be used in combination, both to interconnect a single corner member, or as between different corner members. In some embodiments, some corner members may not need to be interconnected with channels by means of any connection at all. The specific number, type, and combination of the connections will be apparent to the person skilled in the art.

Returning to FIG. 1 and FIG. 2, as noted previously, the above description of duct section 104 is generally representative of duct sections 102, 106, 108.

So as to form the interconnected duct sections forming a portion of duct 100 shown by FIG. 1, duct sections are pairwise interconnected. Specifically, a first open side of duct section 102 is mated to a first open side of duct section 104 and duct sections 102, 104 are interconnected as described below. In turn, a second open side of duct section 104 is mated to a first open side of duct section 106 and duct sections 104, 106 are interconnected as described below. Finally, a second open side of duct section 106 is mated to a first open side of duct section 108 and duct sections 106, 108 are interconnected as described below. Once duct sections 102, 104, 106, 108 are interconnected as described above, air may be transported through this portion of duct 100.

Figure 8:
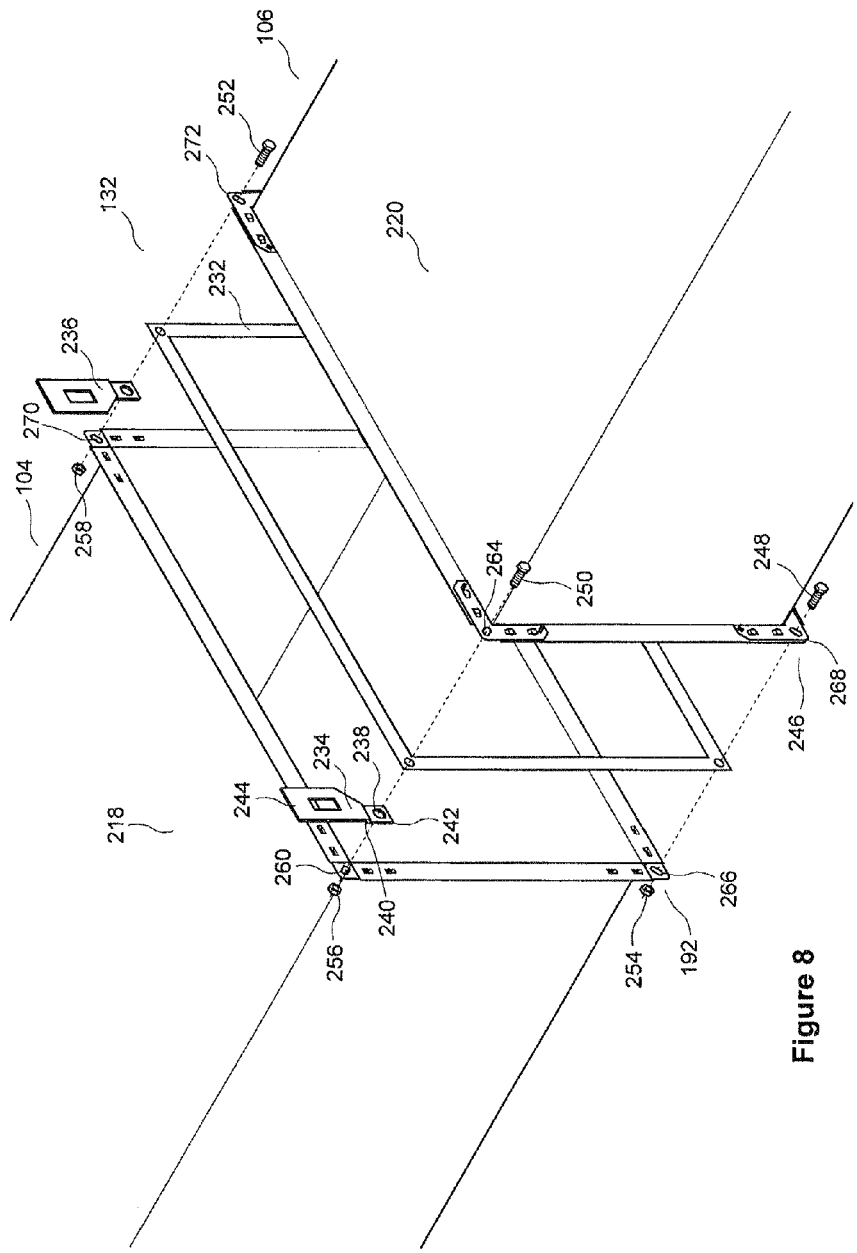
FIG. 8 is an exploded partial view of two interconnected duct sections from the duct of FIG. 1.
Figure 9:
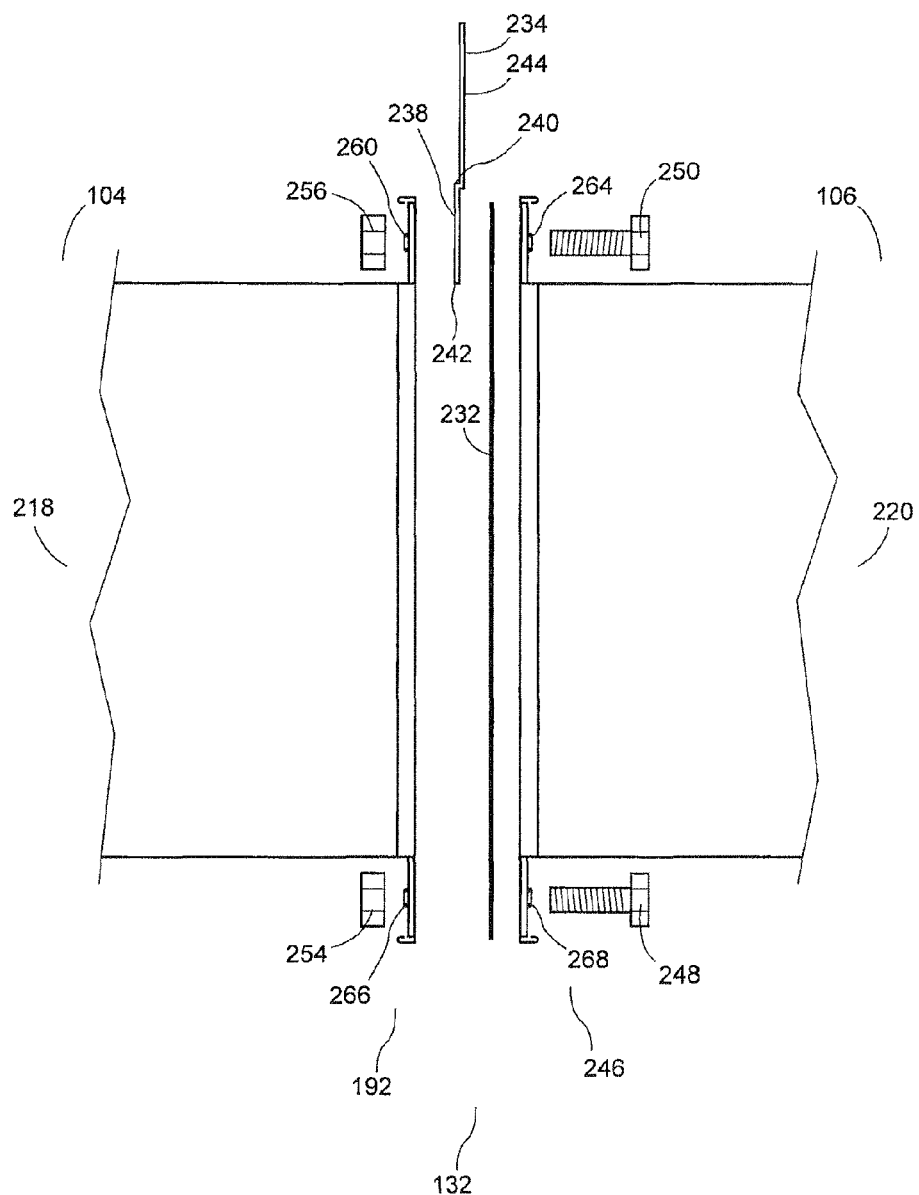
FIG. 9 is an exploded partial sectional view of the interconnected duct sections of FIG. 8.

FIG. 8 and FIG. 9 are exploded partial views of interconnected duct sections 104, 106 and are generally representative of the manner in which duct sections are interconnected.

Duct section 104 comprises in part body 218 and flange 192. Duct section 106 similarly comprises in part a body 220 and a flange 246. Flanges 192, 246 are of similar dimension and shape, namely, as described above, a rectangular frame surrounding open sides of duct sections 104, 106, respectively. Flanges 192, 246 are also of similar construction, again as described above, each comprising four channels and four corner members engaged therewith.

To interconnect duct sections 104, 106, duct sections 104, 106 are first positioned in close proximity so that flanges 192, 246 correspondingly abut. Specifically, each channel and each corner member of flange 192 abuts an equivalent channel or corner member of flange 246, and vice versa. The flange surfaces of abutting channels face one another, and similarly, the channel surfaces of abutting corner members are facing one another. As discussed above with reference to FIG. 3, each corner member has an opening positioned in the corner that the legs of the corner member are disposed at a right angle about to form an L-shape. Accordingly, when duct sections 104, 106 are positioned in close proximity so that flanges 192, 246 correspondingly abut, openings 260, 264 are correspondingly adjacent, openings 266, 268 are correspondingly adjacent, and openings 270, 272 are correspondingly adjacent. For clarity, the fourth corner members (not shown) of each of flanges 192, 246 have similarly correspondingly adjacent openings.

Once duct sections 104, 106 are positioned in close proximity so that flanges 192, 246 correspondingly abut, corner bolts and corner nuts are used to firmly interconnect duct sections 104, 106. Specifically, a corner bolt 248 is inserted through openings 266, 268, mated with a corner nut 254, and corner bolt 248 and corner nut 254 are tightened. Corner bolts 250, 252 are similarly respectively inserted through openings 260, 264 and openings 270, 272, respectively mated with corner nuts 256, 258, and respectively tightened. A corner bolt and a corner nut may be similarly used to connect the openings of the fourth corner member (not shown) of each of flanges 192, 246. As the four corners of flanges 192, 246 are each firmly connected together by the above-described use of corner bolts and corner nuts, duct sections 104, 106 are also firmly interconnected. For ease of reference, interconnected flanges 192, 246 and additional related members such as corner bolts and corner nuts are collectively referred to as a duct joint 132. Duct sections 102, 104 are interconnected by a similarly constructed duct joint 130, and duct sections 106, 108 are interconnected by a similarly constructed duct joint 134.

The skilled person in the art will appreciate that there are suitable alternatives to connecting correspondingly abutting corner members, including, for example, rivets and ties.

Representative duct joint 132 may also optionally include a gasket 232, also known in some circumstances as a sealant. Gasket 232 is placed between flanges 192, 246 so as to improve the seal of duct joint 132 and therefore reduce the leakage of air through duct joint 132 during operational use of duct 100 to transport air. Gasket 232 generally corresponds to the shape and dimensions of flanges 192, 246. Gasket 232 may be pre-manufactured to correspond to the shape and dimensions of flanges 192, 246; alternatively, gasket 232 may be manually shaped to correspond to the shape and dimensions of flanges 192, 246 during installation of gasket 232. In some embodiments of the present invention, gasket 232 may have openings to allow corner bolts to pass through; alternatively, gasket 232 may be constructed and positioned so that corner bolts do not pass through gasket 232. Gasket 232 may be formed from a variety of materials, including, for example, putty, sealant, caulking, rubber or foam.

Clips (not shown) may also be optionally placed over the channels of flanges 192, 246 forming duct joint 132. As discussed above, it may be desirable to reduce the leakage of air through duct joint 132. In the embodiment described above with reference to FIG. 8 and FIG. 9, flanges 192, 246 are interconnected at the corner members of flanges 192, 246. Accordingly, the pressure between flanges 192, 246 may be the greatest at the corner members, and potentially less at other locations along flanges 192, 246 such as the midpoint of the channels of flanges 192, 246. In some circumstances, there may potentially be a poorer seal at areas of lower pressure. Accordingly, clips (not shown) may be optionally placed over part or all of the channels of flanges 192, 246 so as to improve the seal of duct joint 132 and therefore reduce the leakage of air through duct joint 132 during operational use of duct 100 to transport air.

Representative duct joint 132 may also optionally include one or more female mating members, as discussed in more detail below.

Returning to FIG. 1, the depicted interconnected duct sections forming a portion of duct 100 are suspended. As will next be described in detail, in this embodiment of the present invention, two-piece attachment members comprising a male mating member and a female mating member connect one or more inserted and secured (as per the metal formed load-bearing connections described above) corner members to existing means of support.

With reference to FIG. 10A, FIG. 10B, FIG. 10C, and FIG. 10D, a female mating member 276 is depicted corresponding to one embodiment of the present invention. Female mating member 276 may be formed from sheet metal using methods well-known in the art such as stamping. Female mating member 276 comprises a tab 284 and a body 286 depending therefrom by means of an optional ledge 282, as described in more detail below.

Body 286 may be generally rectangular in shape and positioned therewithin may be an opening 280. Opening 280 may be rectangular in shape and is configured to allow a hook of a male mating member to pass therethrough (such as a hook 292 as described below). Opening 280 may be positioned generally in the center of body 286 and body 286 may be approximately double the width and length of opening 280.

Tab 284 may be approximately square in shape and positioned therewithin may be a corner opening 274. Corner opening 274 is configured to allow a corner bolt to pass therethrough (such as corner bolt 248 with reference to FIG. 8). Corner opening 274 may be positioned generally in the center of tab 284 and tab 284 may be sized slightly larger than corner opening 274. The width of tab 284 may be approximately half the width of body 286.

Tab 284 and body 286 may be delineated by means of rectangular shaped ledge 282 so that tab 284 and body 286 lie in parallel planes and wherein ledge 282 lies in a perpendicularly transverse plane to the parallel planes. Ledge 282 depends from tab 284 along the entire width of tab 284 and their intersecting surfaces together form an approximate ninety-degree angle. Ledge 282 further depends from body 286 along the width of body 286 and their intersecting surfaces together form an approximate ninety-degree angle. With reference to FIG. 10C, the approximately equal width of ledge 282 and tab 284 may be approximately half the width of body 286. Ledge 282 may depend from body 286 so that ledge 282 and tab 284 are aligned with one lengthwise side of body 286. Also with reference to FIG. 10C, tab 284, body 286, and ledge 282 may be configured so that tab 284 and body 286 project away from ledge 282 in opposing directions, so as to arrange tab 284, body 286, and ledge 282 in a stepped fashion.

In the depicted embodiment of the present invention, a corner 278 may be removed from body 286 so that, in some circumstances, female mating member 276 may be better handled, installed, or manufactured. As ledge 282 may depend from body 286 along approximately one-half of a widthwise side of body 286, as described above, removed corner 278 may be the corner of body 286 that shares this widthwise side of body 286.

As noted above, tab 284 and body 286 depend from ledge 282 so that tab 284 and body 286 lie in parallel planes. The depth of ledge 282 therefore determines the distance between the parallel planes that tab 284 and body 286 lie in. In one embodiment of the present invention, ledge 282 causes tab 284 and body 286 to be separated approximately by the thickness of the sheet metal from which female mating member 276 is constructed. In another embodiment of the present invention, ledge 282 may not be present so that tab 284 and body 286 lie in the same plane.

With reference to FIG. 1, FIG. 8, and FIG. 9, duct joint 132 may optionally include female mating members 234, 236. The following description in regard to female mating member 234 is illustrative and generally representative of the interaction between a female mating member and a duct joint.

Female mating member 234 is placed between flanges 192, 246 so that a corner opening 238 of female mating member 234 is correspondingly adjacent to openings 260, 264 of corner members comprising in part flanges 192, 246. Corner bolt 250 is inserted through openings 260, 264 and corner opening 238, mated with corner nut 256, and corner bolt 250 and corner nut 256 are tightened. In other embodiments of the present invention, female mating member 234 may be configured to not be placed between flanges 192, 246, but rather, on the opposite side of either flange 192 or flange 246. In other embodiments of the present invention, female mating member 234 may be configured to have a U-shaped tab 242 that may surround flanges 192, 246, rather than be placed between flanges 192, 246.

In this embodiment of the present invention, only a tab 242 of female mating member 234 is positioned directly between flanges 192, 246. Ledge 240 and body 244 typically project perpendicularly outwards beyond flanges 192, 246. In some embodiments of the present invention, female mating member 234 may be rotatable about corner bolt 250. As there may be some gap between flanges 192, 246, in some circumstances it may be possible that female mating member 234 rotates sufficiently about corner bolt 250 so that ledge 240 and body 244 enter the gap between flanges 192, 246 and female mating member 234 will be subsequently difficult to retrieve. One potential advantage of ledge 240 is that ledge 240 restricts ledge 240 and body 244 from entirely entering gaps between flanges 192, 246 smaller than the depth of ledge 240.

In this embodiment of the present invention, as discussed above, ledge 240 depends from body 244 by an offset so that ledge 240 is aligned with one side of body 244. Accordingly, where female mating member 234 is positioned between flanges 192, 246 so that body 244 is inwardly offset (instead of outwardly offset), this offset between ledge 240 and body 244 causes body 244 to only outwardly project beyond flanges 192, 246 in a single axis. One potential advantage is that when female mating member 234 is connected to duct joint 132 in this fashion, female mating member 234 may be positioned to outwardly project beyond duct joint 132 entirely within the footprint of the "top" panel of duct sections 104, 106, as defined above, and accordingly, it may be possible for interconnected duct sections 104, 106 to lie flat on their "sides". This may be advantageous by allowing portions of duct with installed female mating members to lie flat on their sides during storage or transport, and to be potentially stackable.

With reference to FIG. 11A, FIG. 11B, FIG. 11C, and FIG. 11D, a male mating member 288 is depicted corresponding to one embodiment of the present invention. Male mating member 288 may be formed from sheet metal using methods well-known in the art such as stamping. Male mating member 288 comprises a body 290, a hook 292, and a plate 300 which may be equal in width to body 290 and which may depend from body 290 along its entire width to form a approximate ninety-degree angle therebetween.

Body 290 may be generally rectangular in shape and positioned therewithin is a generally rectangular opening 302. Opening 302 may be approximately centered along the width of body 290 and positioned along the length of body 290 at an offset towards the side of body 290 which is opposite the side of body 290 from which the plate 300 depends. In this embodiment of the present invention, hook 292 may be formed from a tab of sheet metal corresponding to opening 302 and may depend from body 290 along one width of the tab. In other embodiments of the present invention, hook 292 may be separately formed and connected to body 290, in such embodiments, opening 302 may therefore not need to be formed in body 290.

Hook 292 may be generally rectangular in shape and may primarily lie in a plane parallel to the plane in which body 290 lies. The side of hook 292 that is furtherest removed from plate 300 depends from body 290 along the entire width of hook 292 by means of an approximate ninety-degree bend 304 in hook 292. Bend 304 causes hook 292 to be offset from body 290 by the approximate thickness of body 286 of female mating member 276. Hook 292 may be constructed to be smaller than opening 280 of female mating member 276 as hook 292 is intended to pass through opening 280 during combined use of male mating member 288 and female mating member 276, as described in more detail below.

In some embodiments of the present invention, hook 292 may include a friction pad 294 so that female mating member 276 and male mating member 288 are more firmly interconnected when used together, as described in more detail below. Friction pad 294 may be constructed to be a shallow triangular protrusion on the face of hook 292 that faces body 290.

Plate 300 may be equal in width to body 290 and depend from body 290 along its entire width to form an approximate ninety-degree angle therewith. Plate 300 may be generally rectangular in shape and may have positioned therewithin a rod opening 298. Rod opening 298 may be approximately centered in plate 300 and may be configured to allow a threaded rod (not shown) to pass therethrough. Plate 300 projects away from the plane in which body 290 lies in the direction opposite the direction in which hook 292 is offset relative to body 290. Gussets 296 positioned across the bend between plate 300 and body 290 may be optionally included to strengthen the bend between plate 300 and body 290.

Figures 12A, 12B:
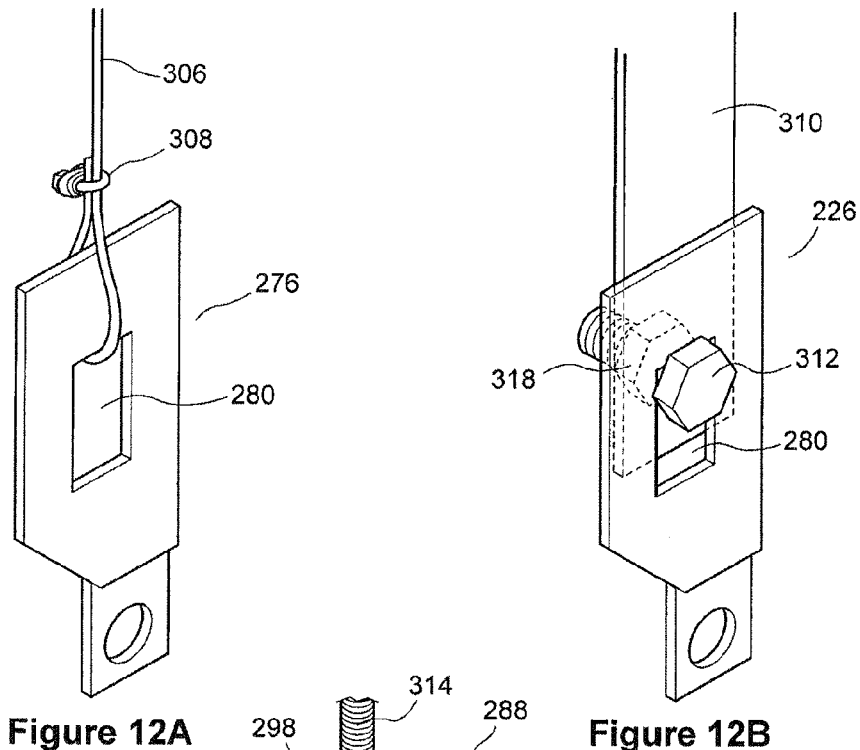
FIG. 12A is a perspective view of the female mating member of FIGS. 10A, 10B, 10C, and 10D connected to steel wire.
FIG. 12B is a perspective view of the female mating member of FIGS. 10A, 10B, 10C, and 10D connected to steel strap.
Figure 12C:
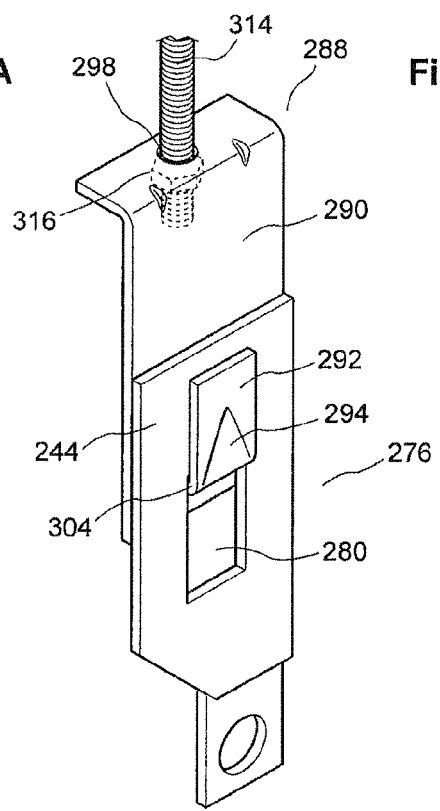
FIG. 12C is a perspective view of the female mating member of FIGS. 10A, 10B, 10C, and 10D interconnected with the male mating member of FIGS. 11A, 11B, 11C, and 11D, showing the male mating member connected to a threaded rod.

With reference to FIG. 12C, to interconnect male mating member 288 with a threaded rod 314, a first end of threaded rod 314 is passed through rod opening 298. Nut 316 is then mated with threaded rod 314 so that male mating member 288 abuts nut 316 from the side of nut 316 opposite the first end of threaded rod 314. Optionally, a second nut (not shown) may be mated with threaded rod 314 and positioned to abut male mating member 288 on the side of male mating member 288 opposite nut 316. It may be advantageous to abut male mating member 288 from both sides with nut 316 and the second nut (not shown) so as to affix male mating member 288 more firmly to threaded rod 314.

With further reference to FIG. 12C, female mating member 276 and male mating member 288 may be interconnected. To do so, female mating member 276 and male mating member 288 are brought into close proximity so that hook 292 passes through opening 280. Once body 244 of female mating member 276 abuts body 290 of male mating member 288, female mating member 276 and male mating member 288 may be shifted in opposite directions so as to insert body 244 of female mating member 276 between hook 292 and body 290 of male mating member 288 until bend 304 abuts, or almost abuts, a side of opening 280. In some embodiments of the present invention, such as if hook 292 includes friction pad 294, body 244 of female mating member 276 may need to be tapped in with a hammer to force body 244 between hook 292 and body 290 of male mating member 288.

In the immediately above-described embodiment of the present invention, female mating member 276 has opening 280 and male mating member 288 has hook 292. In another embodiment of the present invention, the location of opening 280 and hook 292 may be interchanged so that female mating member 276 instead has a hook that passes through a corresponding opening of male mating member so as to interconnect the female mating member and male mating member. In other embodiments of the present invention, other means of connection well known in the art may be employed to connect male mating member and female mating member, such as bolts, rivets, and ties.

Returning to FIG. 1, in this embodiment of the present invention, each of threaded rods 144, 146, 148, 150 are anchored at a first end (not shown) by means well-known in the art to elevated supports (not shown), such as overhead pipes or the surfaces of ceilings. threaded rods 144, 146, 148, 150 terminate at a second end that is interconnected with attachment members 136, 138, 140, 142, each attachment member comprising a female mating member and a male mating member. With reference to FIG. 12C and the description above, threaded rods 144, 146, 148, 150 interconnect with a male mating member of each of attachment members 136, 138, 140, 142. With reference to FIG. 12C and the description above, each male mating member of each of attachment members 136, 138, 140, 142 is in turn interconnected with a female mating member of each of attachment members 136, 138, 140, 142.

Duct joint 130 may include the female mating members of attachment members 136, 138, each female mating member being interconnected with the top corners of the flanges of duct joint 130, as described above. Duct joint 134 similarly may include the female mating members of attachment members 140, 142, each female mating member being interconnected with the top corners of the flanges of duct joint 134, as described above. As duct sections 102, 104, 106, 108 are interconnected at duct joints 130, 132, 134 to form a portion of duct 100, the portion of duct 100 is therefore suspended from elevated supports (not shown) by means of this configuration.

In some embodiments of the present invention, the first ends of threaded rods 144, 146, 148, 150 may be anchored to the same support, but in other embodiments, the first ends of threaded rods 144, 146, 148, 150 may be anchored to one or more supports (e.g. different overhead pipes, or a combination of overhead pipes and surfaces of a ceiling).

In the embodiment of the present invention depicted by FIG. 1, duct 100 is relatively positioned below the supports. In other embodiments of the present invention, duct 100 may be relatively positioned differently, for example, to the side of the support or above the support. Correspondingly, female mating members, and by implication attachment members more generally, may be positioned at various corners of a duct joint. For example, while the embodiment of the present invention depicted by FIG. 1 depicts attachment members positioned at the top corners of a duct joint, in other embodiments of the invention, attachment members may be positioned at the bottom corners of a duct joint, the side corners of a duct joint, or opposing corners of a duct joint. Separate duct joints may have attachment members positioned at different corners.

In the embodiment of the present invention depicted by FIG. 1, duct joint 132 is not supported with attachment members connected to means of support as it may not be necessary to support duct 100 at every duct joint. FIG. 1 depicts duct 100 supported at every 2th duct joint, but in other embodiments of the invention, duct 100 may be supported at every Nth duct joint, where the upper bound for N may be determined by the skilled person in the art in view of considerations such as the weight and structural integrity of duct 100. In other embodiments of the invention, duct 100 may also be supported at irregularly spaced duct joints, again as determined by the skilled person in the art in view of considerations such as the weight and structural integrity of duct 100.

In the embodiment of the present invention depicted by FIG. 1, each duct joint includes either no female mating members or two female mating members. In other embodiments of the invention, a given duct joint may include different numbers of female mating members. For a rectangular duct, a given duct joint may include between zero and four female mating members, each of which may or may not be in fact connected to means of support.

In the embodiment of the present invention depicted by FIG. 1, only means of supporting duct 100 by means of female mating members interconnected with a flange are shown. In other embodiments of the present invention, other prior art means of supporting duct 100 such as cradle bars may be used in combination with the methods and apparatus of the present invention.

The use of hook 292 and opening 280 to interconnect female mating member 276 and male mating member 288 may be advantageous in some circumstances. For example, with reference to FIG. 1, one method of installing duct sections 102, 104, 106, 108 is to first interconnect at ground level duct sections 102, 104, 106, 108, including the female mating members of attachment members 136, 138, 140, 142. Separately, corresponding male mating member of attachment members 136, 138, 140, 142 may be attached to the second ends of threaded rods 144, 146, 148, 150 in a loose fashion that allows the male mating members to shift. Interconnected duct sections 102, 104, 106, 108 may then be elevated so that the connected female mating members are approximately at the same position as each corresponding male mating member. It is then possible to interconnect each pair of female mating member and male mating member by making precise adjustments to interconnect each pairing in series, as opposed to simultaneously positioning all four pairings.

FIG. 12A and FIG. 12B depict alternative illustrative means to connect a female mating member to existing means of support without the use of a male mating member.

FIG. 12A shows the use of a length of steel wire 306, anchored at one end to a support (not shown), and the other end interconnected with female mating member 276 by passing steel wire 306 through opening 280, and connecting steel wire 306 back to itself with a lock 308. A duct section may be connected to female mating member 276 and therefore supported by steel wire 306 as described above.

FIG. 12B shows the use of a steel strap 310, anchored at one end to a support (not shown), and the other end interconnected with female mating member 276 by means of a connecting bolt 312 and a nut 318. connecting bolt 312 is passed through an opening (not shown) in steel strap 310 and opening 280 of female mating member 276, mated with nut 318, and connecting bolt 312 and a nut 318 are tightened so as to interconnect female mating member 276 and steel strap 310. A duct section may be connected to female mating member 276 and therefore supported by steel strap 310 as described above.

All publications and patent applications mentioned in this specification are herein incorporated by reference to the same extent as if each individual publication or patent application was specifically and individually incorporated by reference.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A support assembly for connecting an air transport duct to a support, said support assembly comprising:
   a first mating member; and
   a second mating member rigidly connectable to said first mating member;
   wherein said first mating member includes a flat tab at a terminal end thereof for securing said support assembly to a duct section of said duct via attachment of said flat tab to an insertable corner member positioned in a first receiving channel and a second receiving channel of a flange of said duct section and attached to at least one of said first receiving channel and said second receiving channel;
   wherein said second mating member includes a surface at a terminal end thereof, said surface having an aperture therethrough and being generally transverse to said flat tab of said first mating member when said first and second mating members are connected to one another for securing said support assembly to said support; and
   wherein said insertable corner member forms a load bearing connection with at least one of said first receiving channel and said second receiving channel and is capable of supporting a predetermined portion of a weight of said duct.

2. The support assembly according to claim 1, wherein:
   said first and second mating members include a hook located on one of said first and second mating members and a corresponding aperture located on another of said first and second mating members for engaging with said hook so as to selectively connect said first and second mating members to one another.

3. The support assembly according to claim 2, wherein:
   said corresponding aperture is located on said first mating member and said hook is located on said second mating member.

4. The support assembly according to claim 3, wherein:
   said corresponding aperture of said first mating member is a slot and said hook of said second mating member slidably engages with said slot.

5. The support assembly according to claim 4, wherein:
   said flat tab has an aperture therethrough that is axially aligned with an aperture in said insertable corner member.

6. The support assembly according to claim 5, wherein:
   said second mating member is generally L-shaped.

7. The support assembly according to claim 6, wherein:
   said surface of said second mating member is transverse to a direction of said sliding engagement of said hook and said slot.

8. The support assembly according to claim 7, wherein:
   said hook of said second mating member includes a friction pad thereon for press-fit connection of said first and second mating members to one another.

9. The support assembly according to claim 5, wherein:
   said duct section includes two terminal open ends and said flange disposed around at least one of said open ends for abutting connection to the flange of an adjacent duct section of said duct, said flange having said first receiving channel adjacent to a first corner thereof and said second receiving channel that is generally transverse to said first receiving channel and adjacent said first corner.

10. The support assembly according to claim 9, wherein:
    said insertable corner member is generally L-shaped;
    wherein each said flange has flange portions thereof that are correspondingly adjacent to peripheral edges of said terminal open ends of said duct section;
    wherein a first pair of immediately adjacent flange portions at said peripheral edges of each terminal open end of said duct section form a first gap located at said first corner of each said flange, said first and second receiving channels of each said flange being respectively located in said immediately adjacent flange portions; and
    wherein said insertable corner member, when positioned into said first and second receiving channels of each said flange, occupies said first gap and thereby presents a connecting surface for said flat tab of said first mating member.

11. The support assembly according to claim 10, wherein:
    said connecting surface of said insertable corner member includes an aperture therethrough for receiving a fastener that is likewise receivable by said aperture of said flat tab of said first mating member to thereby secure said insertable corner member to said first mating member.

12. The support assembly according to claim 11, wherein:
    said first mating member provides a shoulder adjacent said flat tab for abutment against at least one of said flanges of said duct section when said first mating member is secured to said insertable corner member such that rotation of said first mating member relative to said duct section is thereby arrested.

13. The support assembly according to claim 12, wherein:
    said first mating member provides a generally flat planar portion in which said slot is disposed, with said flat tab stepwise depending from said flat planar portion to thereby form said shoulder.

14. The support assembly according to claim 13, wherein:
said flat tab is offset from a longitudinal axis of said flat planar portion, such that when said first mating member is secured to said insertable corner member, said first mating member is capable of being positioned so that said first mating member does not extend laterally beyond an adjacent sidewall of said duct section.

15. The support assembly according to claim 13, wherein:
said first mating member and said second mating member are formed from sheet metal.

\* \* \* \* \*